Oct. 30, 1962
R. A. HAWLEY
3,061,345
FOOD MOLD LOADING APPARATUS
Filed May 2, 1960
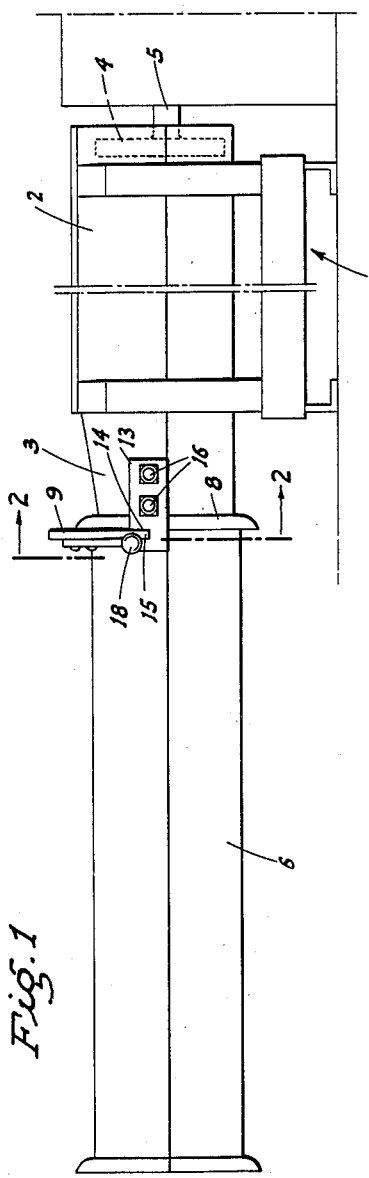
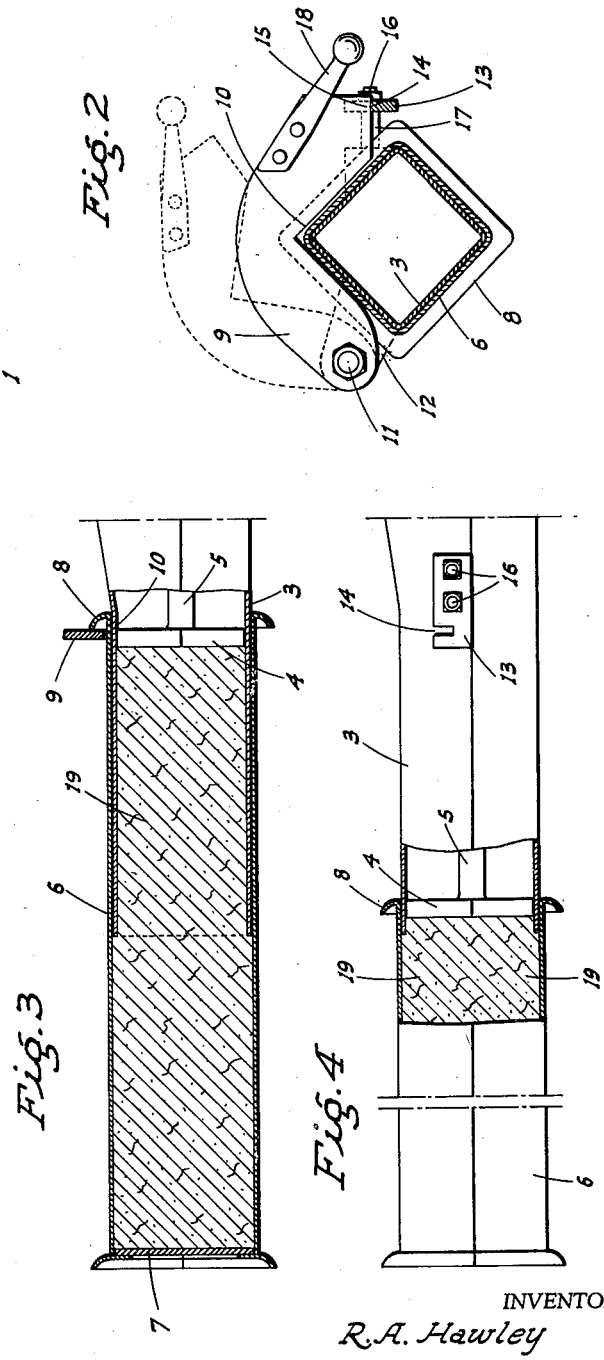
INVENTOR
R. A. Hawley
BY Webster & Webster
ATTORNEYS

United States Patent Office 3,061,345
Patented Oct. 30, 1962

3,061,345
FOOD MOLD LOADING APPARATUS
Richard A. Hawley, Oakland, Calif., assignor to Meat Packers Equipment Co., Oakland, Calif., a corporation of California
Filed May 2, 1960, Ser. No. 26,095
3 Claims. (Cl. 287—119)

This invention relates to a food mold loader, and particularly to one of that type wherein a food product, such as boneless ham, or other meat, is forced by a plunger through a stuffing horn into a mold removably mounted in connection with the horn.

The main object of the present invention is to provide a simplified form of latch or locking means directly connected between the horn and the mold, so that the mold cannot move lengthwise of and away from the horn while the meat is being forced to the mold from the horn.

A further object of the invention is to arrange the mold and latching means so that the mold is firmly supported by the horn when latched and being partly loaded; completion of the mold loading operation being accomplished, together with sliding movement of the mold off the horn, upon release of the latching device and the advance of the plunger of the loader. In this manner, manual handling of the mold, from the time it is first mounted on the horn until the mold is fully loaded, is greatly facilitated.

Another object of the invention is to provide a practical, reliable, and durable food mold loading apparatus, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation of a mold as mounted on the horn of a conventional loading apparatus, and with the mold latched against retractive movement.

FIG. 2 is an enlarged cross section taken on line 2—2 of FIG. 1.

FIG. 3 is a fragmentary longitudinal elevation, mainly in section, of the horn showing the mold mounted thereon and latched; the mold being loaded as far as possible before the latch is released.

FIG. 4 is a similar view, partly in section, of the horn and mold after the release of the latch, and showing the plunger fully advanced and the mold substantially fully loaded and retracted from the horn.

Referring now more particularly to the drawings, and to the characters of reference marked thereon, the mold loader, indicated generally at 1, and which is of a generally conventional type and of itself forms no part of this invention, includes a press chamber 2 in which the meat is initially formed to a predetermined cross section, and from which the meat is forced into a horizontal stuffing horn 3 by a plunger 4 fixed on the free end of a piston rod 5 projecting from a fluid pressure cylinder, as usual. The stroke of the plunger is such that said plunger can travel from the rear end of chamber 2, as indicated in FIG. 1, to the front end of horn 3, as shown in FIG. 4.

Slidably fitting onto the horn is a meat mold 6, of tubular open-ended form, and which at its outer or base end is normally closed by a removable insert plate 7. The mold is provided at its top or forward end with a rigid outwardly projecting flange 8 thereabout.

The horn 3 is of square form in cross section, and is disposed with its opposite corners in vertical and horizontal planes, as clearly shown in FIG. 2. The mold is of course of the same form, and is arranged to advance onto the horn to a point such that the outer end of the horn is then located substantially midway of the length of the mold, as shown in FIG. 2.

A transverse latch plate 9, disposed in a vertical plane, is formed at its lower edge with an inverted right-angle V-shaped notch 10 of a size to straddle the adjacent upwardly facing walls of the mold 6.

The plate 9 at one lateral end is swivelly mounted at one side of the horn 3 on a pin 11 which extends lengthwise of the horn and is secured on an ear 12 which projects laterally from the horn. This ear is located on the horn at a point such as to form a stop for the advance of the mold onto the horn, and so that the latch plate 9 will be disposed directly behind the mold flange 8 when the mold has reached the above recited midway position on the horn.

A vertical latch engaging plate 13, having a depending notch 14 therein, is provided to receive the adjacent end 15 of the swinging latch plate 9 laterally out from the V-notch 10 when the plate 9 is swung down to a fully lowered position over the mold 6. This plate 13, is rigidly supported from the horn by suitable means, such as bolts 16. These bolts are set back from the notch 14 a sufficient distance to allow the mold flange 8 to be disposed back of the notch, and said bolts are provided with spacers 17 between the horn and the plate 13 so that the latter is held laterally out from the horn a sufficient distance for the mold flange 8 to clear the plate 13, as shown in FIG. 2, when the mold 6 is being slid to a fully advanced position on the horn.

In order to control the swinging of the latch plate 9, said plate is provided with a handle 18 projecting laterally of the loader from the end of the plate opposite the pivot pin 11.

In operation, the empty mold 6 to be loaded is slid onto the horn 3; the latch plate 9 being then swung up and held out of the way until the advance of the mold is halted by the stop 12 and the mold flange 8 is beyond said latch plate. The latter is then lowered over the mold and in front of the flange, as shown in FIG. 3, and so that the end 15 of the latch plate is engaged in the notch 14 of the fixed plate 13, as shown in FIGS. 1 and 2.

The plunger 4, which at that time is at the back of the press chamber 2 of the loader, is then advanced to force the meat 19 from said chamber into the foremost or bottom portion of the mold. This advance of the plunger is continued until the mold is filled from the bottom plate 7 to the outer end of the horn, at which time the plunger reaches a point adjacent the zone of the latch plate 9, as shown in FIG. 3. At this time, the portion of the horn beyond the plunger is still filled with meat, while the portion of the mold which overlaps the horn remains empty.

The plunger advance is then temporarily halted in order to relieve the pressure on the mold and enable the operator to swing the latch plate 9 up and clear of the mold flange 8, as indicated in dotted lines in FIG. 2.

The advance of the plunger is then continued so that the remaining meat is forced from the horn and into the mold; the latter then backing freely off the horn at the same speed as the advance of the plunger. The mold thus becomes practically completely filled by the time the horn is emptied, as shown in FIG. 4.

From the foregoing description it will be readily seen that there has been produced such an apparatus as will fully fulfill the objects of the invention, as set forth herein.

While this specification sets forth in detail the present and preferred construction of the apparatus, still in practice such deviations therefrom may be resorted to as do not form a departure from the spirit of the invention, as defined by the appended claims.

Having thus described the invention, the following is claimed as new and useful, and upon which Letters Patent are desired:

1. A device of the character described, including a releasable latch between two tubular telescoping and slidable members, the latch comprising an enlarged flange projecting laterally out from the inner end of the first telescoping member, a latch plate extending transversely of the second telescoping member and first telescoping member and formed to embrace the upper portion of the periphery of the first telescoping member immediately behind the flange, and means pivoting the plate at one end on one side of the second telescoping member for upward swinging movement from said embracing position and so as to clear the first telescoping member and flange when swung up through a predetermined arc.

2. A device, as in claim 1, with a member fixed on the second telescoping member on the side thereof directly opposite the pivot means in a position clear of the first telescoping member and flange, said member having a notch disposed to receive the adjacent end of the latch plate when said plate is swung down to its embracing position.

3. A device of the character described, including a releasable latch between two tubular telescoping and slidable members, the latch comprising an enlarged flange projecting laterally out from the inner end of the first telescoping member, a latch plate extending transversely of the second telescoping member and first telescoping member and formed to embrace a portion of the periphery of the first telescoping member immediately behind the flange, an ear fixed on the second telescoping member in position for engagement by the inner end of the first telescoping member when the latter is fully advanced onto the second telescoping member, and a pivot pin connecting the ear and one end of the plate to enable the latter to be swung from its embracing position to a position clear of the first telescoping member and flange.

References Cited in the file of this patent

UNITED STATES PATENTS

| | | |
|---|---|---|
| 764,347 | Carlson | July 5, 1904 |
| 1,058,226 | Eckoff | Apr. 8, 1913 |
| 2,182,891 | Eikel | Dec. 12, 1939 |
| 2,337,406 | Opie | Dec. 21, 1943 |
| 2,475,548 | Kearns | July 5, 1949 |
| 2,696,442 | Allbright | Dec. 7, 1954 |
| 2,720,737 | Vogt | Oct. 18, 1955 |
| 2,917,888 | Hawley | Dec. 22, 1959 |

FOREIGN PATENTS

| | | |
|---|---|---|
| 257,406 | Great Britain | Sept. 2, 1926 |